(12) United States Patent
Hoppenz et al.

(10) Patent No.: US 7,014,219 B2
(45) Date of Patent: Mar. 21, 2006

(54) PIPE JOINT AND METHOD OF PRODUCING A PIPE JOINT

(75) Inventors: Andreas Hoppenz, Raunheim (DE); Dirk Steding, Altenstadt (DE)

(73) Assignee: Siemens Aktiengesellschaft, Munich (DE)

(*) Notice: Subject to any disclaimer, the term of this patent is extended or adjusted under 35 U.S.C. 154(b) by 76 days.

(21) Appl. No.: 10/299,858

(22) Filed: Nov. 20, 2002

(65) Prior Publication Data
US 2003/0107219 A1  Jun. 12, 2003

(30) Foreign Application Priority Data
Nov. 20, 2001 (EP) ............................ 01127674

(51) Int. Cl.
*F16L 47/00* (2006.01)
*F16L 21/02* (2006.01)

(52) U.S. Cl. .............. 285/296.1; 285/294.3; 285/10; 285/374

(58) Field of Classification Search ............ 285/296.1, 285/294.3, 10, 399, 374, 93, FOR. 171, FOR. 174
See application file for complete search history.

(56) References Cited

U.S. PATENT DOCUMENTS

| | | | |
|---|---|---|---|
| 339,036 A * | 3/1886 | Wilbur | 285/294.3 |
| 693,830 A * | 2/1902 | Burke | 285/289.1 |
| 868,349 A | 10/1907 | Lomax | |
| 2,001,043 A | 5/1935 | Ukropina | |
| 2,492,823 A | 12/1949 | Young | |
| 3,860,270 A | 1/1975 | Arnold | |
| 3,916,502 A * | 11/1975 | Bagnulo | 29/890.14 |
| 3,960,394 A * | 6/1976 | Hubner et al. | 285/296.1 |
| 4,226,444 A * | 10/1980 | Bunyan | 285/21.1 |
| 4,591,193 A * | 5/1986 | Oltmanns et al. | 285/345 |
| 4,647,080 A | 3/1987 | Sandt et al. | |
| 4,804,209 A * | 2/1989 | Fischer | 285/31 |
| 5,486,024 A * | 1/1996 | Dierdorf | 285/294.3 |

FOREIGN PATENT DOCUMENTS

| | | | | |
|---|---|---|---|---|
| DE | 242857 A | * | 2/1987 | 285/FOR. 171 |
| GB | 1293371 A | * | 10/1972 | 285/FOR. 174 |

* cited by examiner

Primary Examiner—James M. Hewitt
(74) Attorney, Agent, or Firm—Harness, Dickey & Pierce P.L.C.

(57) ABSTRACT

A pipe joint includes at least a first and a second pipe. A section of the first pipe is opened out and a further section of the second pipe is inserted into the section, so that both pipes overlap in an overlap region. A gap is formed between the section and the further section, into which gap a free-flowing sealing medium can be introduced via an input passage. In the method, a first and a second pipe are fitted together, a sealing medium is introduced into the gap between the pipes via an input passage, air located in the gap escaping via at least one output passage, and the input passage and the output passage are closed. The sealing medium, preferably an epoxy-resin/glass-fiber mixture, ensures especially effective sealing of the pipe joint and also an especially stable frictional connection between the pipes.

31 Claims, 1 Drawing Sheet

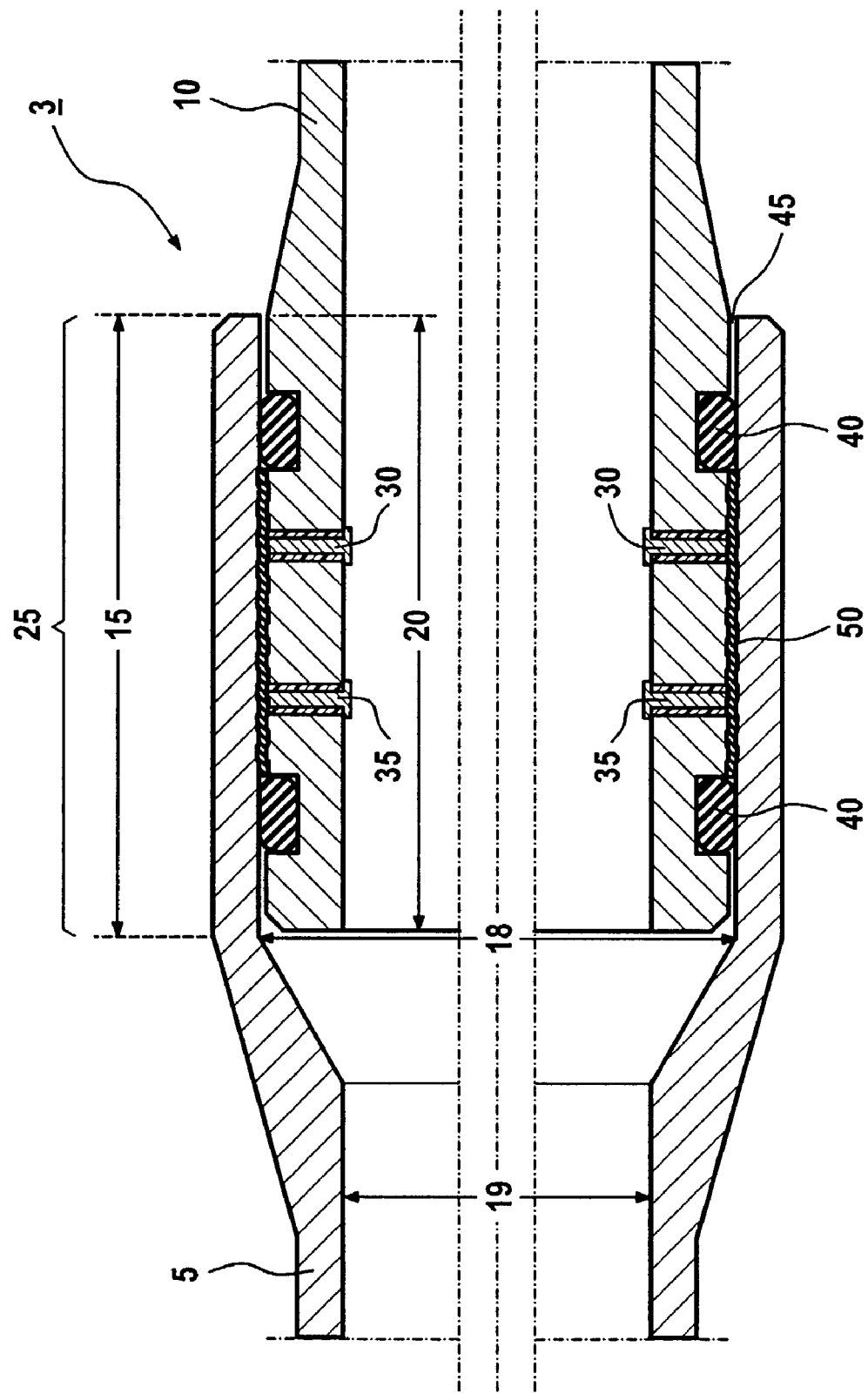

PIPE JOINT AND METHOD OF PRODUCING A PIPE JOINT

This application claims priority on European Patent Application No. 01127674.8 filed Nov. 20, 2001, the entire contents of which are hereby incorporated by reference.

FIELD OF THE INVENTION

The invention generally relates to a joint between at least two pipes. More preferably, it relates to pipes being fitted together like a push-in bell-and-spigot pipe joint, so that both pipes overlap in an overlap region.

BACKGROUND OF THE INVENTION

Pipe joints have been known for a long time in order to form, in particular, a longer pipeline, for example a water supply line or any other desired supply line, from individual pipes.

In order to protect the pipeline from an undesirable escape of the flow medium to be transported in it and to prevent ingress of a medium possibly located outside the pipeline into the pipeline, it is known to attach seals in the overlap region of the respective pipes for closing the gap formed between the pipes. These seals extend, for example, as sealing rings along the circumference of one of the pipes and are inserted into a groove of this pipe. In this way, the escape of the flow medium or the ingress of a medium located outside the pipeline is at least made more difficult.

A disadvantage in this case is that, although certain sealing of the pipeline is achieved in this way, the connecting points between the pipes are not very stable, since there is play between the pipes on account of the gap inevitably located between the pipes. Thus, for example, an unintentional movement of such a laid pipeline may lead, in the region of the connecting points, to at least partial loosening of the joint and therefore to damage to the pipeline, so that the latter at least becomes leaky. This situation occurs very frequently during building measures which are carried out in the vicinity of such a pipeline.

In addition, in order to increase the stability of a pipeline in the region of the connecting points between the pipes, it is known to connect the pipes by means of mechanical couplings (e.g. "locking keys") or flanged or laminated joints. As a result, a certain frictional connection is achieved between the pipes in the overlap region; however, said types of connection, depending on the embodiment, are sensitive to rotation and/or movements in the longitudinal direction of the pipeline, so that damage is to be feared despite the increased stability.

SUMMARY OF THE INVENTION

An object of an embodiment of the invention is therefore to specify a pipe joint and a method of producing a pipe joint which in particular overcome the disadvantages, can be produced or respectively carried out in a simple and cost-effective manner and/or are suitable both for the construction of a new pipeline and for the renovation of an existing pipeline.

With regard to the pipe joint, an object may be achieved according to an embodiment of the invention, by a pipe joint comprising at least a first and a second pipe, a section arranged at an end of the first pipe being opened out and a further section arranged at a further end of the second pipe being inserted into the section of the first pipe, so that an overlap region of the section and of the further section is formed like a push-in bell-and-spigot pipe joint, a gap being formed between the section and the further section, and at least one input passage being arranged in the overlap region on the first and/or second pipe, via which input passage a free-flowing sealing medium can be introduced into the gap.

An embodiment of the invention in this case is based on the idea that the gap, for the purpose of preventing the escape of a flow medium, flowing into the pipes, from the pipe joint, can be reliably sealed off by the introduction of a free-flowing sealing medium. The introduction of the sealing medium before the pipes are joined together is not possible in practice, which is why an input passage is provided, via which the sealing medium can be introduced into the gap once the two pipes have been joined together, for example fitted together. This ensures that the gap can be filled as completely as possible with sealing medium and the sealing effect is optimal as a result. Furthermore, the sealing medium also prevents undesirable ingress of a medium possibly located outside the pipe joint when the pipe joint is laid as part of a pipeline.

A number of input passages for the sealing medium are preferably arranged in the overlap region on the first and/or second pipe, preferably along the circumference of the first and/or second pipe, so that the gap can be filled uniformly with sealing medium. The sealing effect is thus uniform over the entire circumference of the overlap region, in particular if the input passages are arranged equidistantly.

In a further advantageous configuration of an embodiment of the invention, an output passage is arranged in the overlap region on the first and/or second pipe, via which output passage air which is located in the gap can escape.

When the sealing medium is introduced into the gap, the air is displaced from the gap and requires a means of escape in order to be able to fill the gap with sealing medium as completely as possible. Furthermore, air pockets in the sealing medium, which could arise if there is no means of escape and could reduce the sealing effect of the sealing medium, are reliably avoided by the output passage, since the air can escape via the output passage.

In addition, the output passage ensures that the sealing medium is introduced into the gap via the input passage in a very simple manner, in particular without the expenditure of force.

A number of output passages are advantageously arranged in the overlap region on the first and/or second pipe, preferably along the first and/or second pipe, so that the air located in the gap can escape uniformly via the output passages; to this end, the output passages are expediently arranged equidistantly. Thus the uniform distribution and introduction of the sealing medium into the gap with little force via the input passage or passages are further assisted.

At least two spaced-apart physical seals, preferably sealing rings, are expediently arranged in the overlap region between the first and the second pipe, which seals preferably extend over the circumference of the first and/or second pipe and are each inserted into a circumferential groove of the first and/or second pipe, the at least one input passage and the at least one output passage being arranged between the at least two physical seals.

The physical seals, which may be designed as sealing rings for example, improve the sealing of the pipe joint in the overlap region. The gap is now even better protected against undesirable escape of a flow medium conducted in the pipes of the pipe joint, which flow medium, in this embodiment of the invention, before escape, would still have to overcome the barrier formed by the physical seals. Thus undesirable escape of the flow medium from the overlap region of the pipes via the gap into the outer region of the pipe joint is virtually impossible. The same likewise applies to undesirable ingress of a medium into the pipes of the pipe joint.

In a further preferred embodiment of the invention, the at least one input passage is arranged in the section of the first pipe on the outer surface of the first pipe.

In this embodiment, the sealing medium is introduced into the gap from the outer region of the pipe joint. This is especially advantageous if the sealing medium is to be introduced into an already laid pipeline including pipe joints according to an embodiment of the invention. In such a pipeline, the access to the gap is possible from the outside in an especially simple manner.

It is also conceivable for virtually any, already laid pipeline which is composed of push-in bell-and-spigot pipe joints to be subsequently strengthened according to an embodiment of the invention. To this end, at least one input passage for a free-flowing sealing medium is then to be provided at least in the overlap region of the pipes, so that the gap in the overlap region between the pipes can be filled with the sealing medium. Thus such a pipeline can be advantageously improved and/or renovated. A pipe joint according to an embodiment of the invention may also advantageously be realized subsequently in an already existing pipeline in order to obtain a pipeline according to an embodiment of the invention.

In another advantageous embodiment of the invention, the at least one input passage is arranged in the further section of the second pipe on the inner surface of the second pipe.

In this embodiment of the invention, the sealing medium is introduced into the gap from the interior of the pipes via the input passage. This is possible in an especially advantageous manner when the pipeline is newly laid and the pipes are fitted together step by step. There is then no possibly disturbing input passage on the outer surface of the pipes, and the surface of the pipeline thus obtained is especially smooth. Such injection of the sealing medium from the inside is possible in particular at large, "accessible" pipe diameters and also in the case of buried pipes which are already embedded in the ground.

Furthermore, the at least one output passage may be arranged in the section of the first pipe on the outside of the first pipe. In this embodiment, those features of an embodiment of the invention of the pipe joint which are important to an embodiment of the invention are especially readily accessible from outside and the advantages according to an embodiment of the invention can thus be controlled in a simple manner.

In another embodiment of the invention, the at least one output passage is arranged in the further section of the second pipe on the inner surface of the second pipe. Thus a smooth surface of the pipe joint is obtained, especially when the at least one input passage is also arranged on the inner surface.

The sealing medium is preferably a curable plastic, preferably an epoxy-resin/glass-fiber mixture. On account of its free-flowing capacity, such a sealing medium is very simple to manipulate at the instant it is introduced into the gap; for example, it can be injected into the at least one input passage by use of a press. The sealing medium cures there, becomes stable and develops its sealing effect.

A frictional connection is preferably formed between the section of the first pipe and the further section of the second pipe by use of the sealing medium.

To achieve this advantage, the use of the aforesaid epoxy-resin/glass-fiber mixture as sealing medium is especially suitable. However, other sealing media are also conceivable.

Due to the frictional connection, the pipe joint in the overlap region is especially stable, especially against rotation and pulling/compression along the longitudinal axis of the pipe joint, without additional mechanical stabilizing elements having to be attached from outside and/or inside in the overlap region.

The section and the further section are advantageously connected in a watertight manner by means of the sealing medium. In this case, "watertight" is generally intended to mean that no free-flowing medium can enter and/or escape from the pipe joint via the gap in an undesirable manner.

In an especially preferred configuration of an embodiment of the invention, the inner surface of the section of the first pipe and/or the outer surface of the further section of the second pipe is/are roughened and/or has/have a profile.

In this way, the "bearing area" on the first and/or second pipe for the sealing medium is enlarged, so that in particular the frictional connection achieved via the sealing medium and/or the sealing effect between the pipes is improved.

A pipe joint according to an embodiment of the invention has good mechanical strength in particular when the first and/or the second pipe is/are made of a glass-fiber-reinforced plastic.

In addition, an embodiment of the invention leads to a method of producing a pipe joint between a first pipe having an opened-out section arranged at its one end and a second pipe having a further section arranged at a further end of the second pipe, comprising the following steps:

1. The further section of the second pipe is inserted into the section of the first pipe.
2. A sealing medium is introduced into a gap between the section and the further section via at least one input passage arranged in the overlap region of both pipes on the first and/or second pipe, air located in the gap escaping via at least one output passage arranged in the overlap region of both pipes on the first and/or second pipe.
3. The input passage and the output passage are closed.

The advantageous effects already cited for the pipe joint according to embodiments of the invention also apply by analogy to the method according to embodiments of the invention. Furthermore, corresponding embodiments for the method are also conceivable in accordance with the advantageous configurations of the pipe joints according to embodiments of the invention.

BRIEF DESCRIPTION OF THE DRAWINGS

An exemplary embodiment of the invention is described in more detail below. In the drawing, the FIGURE shows a longitudinal section through a pipe joint according to an embodiment of the invention.

DETAILED DESCRIPTION OF THE PREFERRED EMBODIMENTS

The FIGURE shows a pipe joint 3 according to an embodiment of the invention between a first pipe 5 and a second pipe 10.

The first pipe 5 has an opened-out section 15, into which a further section 20 of the second pipe 10 is inserted, for example like a push-in bell-and-spigot pipe joint. A gap 45 is formed between the section 15 and the further section 20.

The section 15 and the further section 20 overlap in an overlap region 25. In the embodiment of the invention shown, a number of input passages 30, which are designed as injection nipples for example, are arranged, preferably equidistantly, on the circumference of the second pipe 10. Via these input passages 30, a sealing medium 50 can be introduced into the gap 45 from the inner surface of the second pipe 10, so that the gap 45 can be closed by the sealing medium 50.

The section 15 is opened out inasmuch as the pipe cross section 18 assigned to it is larger than the pipe cross section 19, which is designed for a desired rate of flow.

Furthermore, output passages 35 are arranged, preferably equidistantly, on the circumference of the second pipe 10, via which output passages 35 air which is located in the gap 45 can escape when the sealing medium is thus injected.

The introduction of the sealing medium 50 into the gap 45 leads to a displacement of air which is located in the gap 45. The output passages 35 via which said air can escape from the gap 45 are provided so that the sealing medium 50 can be introduced into the gap 45 especially easily and with little expenditure of force. In this way, undesirable air pockets in the sealing medium 50 are also avoided. The output passages 35 are designed, for example, as vent nipples.

After the sealing medium 50 has been introduced into the gap 45, the input and output passages 30 and 35, respectively, are closed, for example by means of caps sealing the input and output passages. In this way, in particular undesirable escape of sealing medium 50 from the gap 45 is avoided in a reliable manner.

Furthermore, in the embodiment shown of a pipe joint 3 according to the invention, two spaced-apart physical seals, preferably sealing rings, are arranged in the overlap region 25. These seals 40 firstly promote the sealing of the gap 45 against undesirable ingress or escape of a flow medium into or from the pipe joint and secondly limit a region inside the gap 45 in which the sealing medium 50 is introduced. This reliably prevents the sealing medium 50 from flowing undesirably from the gap 45 both into and out of the pipe joint.

The pipes 5, 10 form an especially robust pipe joint if the pipes 5, 10 are made of glass-fiber-reinforced plastic.

Instead of the arrangement, shown in this embodiment, of the input and output passages 30, 35 along the circumference of the second pipe 10 on its inner surface, the input and/or output passages 35 may also be arranged along the circumference of the first pipe 5 on its outer surface in the section 15, so that the sealing medium 50 can be introduced into the gap 45 from the outside of the pipe joint 3 and/or the air located in the gap 45 can escape into the outer region of the pipe joint 3. The arrangement of the input and output passages 30, 35 may be selected in accordance with the desired application; the arrangement of said passages on the circumference of the second pipe 10 offers in particular the advantage that the pipe joint 3 according to the invention is thereby given an especially smooth outer surface. Such injection of the sealing medium 50 from the inside is possible in particular at large, "accessible" pipe diameters and also in the case of buried pipes which are already embedded in the ground.

The possible arrangement of the passages on the outer surface of the first pipe in the section 15 has the advantage that the passages are accessible from outside, so that, for example, repair work on an already laid pipe joint can easily be carried out. Furthermore, it is also possible to strengthen an already laid pipeline which is composed of a plurality of individual pipes like a push-in bell-and-spigot pipe joint to form a pipe joint 3 according to the invention by at least the input passages 30 being retrofitted without having to dismantle the pipeline for this purpose.

An especially suitable sealing medium 50 is, for example, an epoxy-resin/glass-fiber mixture. This is a cured plastic which is injected in a free-flowing form into the input passage or passages 30 and which then cures in the gap 45.

After the sealing medium 50 has hardened, a frictional and watertight bond is produced between the section 15 of the first pipe 5 and the further section of the second pipe 10. As a result, the pipe joint 3 according to the invention becomes especially stable in the overlap region 25 against rotation and/or the action of force (pulling/compression) in the direction of the longitudinal axis of the pipe joint 3 without mechanical attachments having to be used in order to achieve the friction grip.

The friction grip can be increased by the outer surface of the second pipe 10 in the further section 20 and/or the inner surface of the first pipe 5 in the section 15 being roughened or provided with a profile. This profile may be of any desired shape. By these measures, on account of the now enlarged application surfaces for the sealing medium, improved interlocking between the sealing medium 50 and the first and/or second pipe 5, 10 is achieved, as a result of which the bond between the first and the second pipe is improved and thus the possibility of transmitting force from the first to the second pipe or vice versa is increased.

Furthermore, the input and output passages 30, 35 may be used for checking the pipe joint for tightness. In a tight pipe joint, flow medium conducted in the pipe joint must not escape from input and output passages which are not sealed. In addition, it must not be possible to introduce a free-flowing medium into the interior space of the pipe joint from outside via the input and output passages. However, if this is possible, a lack of tightness of the pipe joint can be expected and appropriate repair work can be specifically initiated.

A pipe joint according to the invention may be used as standard and may thus replace conventional expensive system solutions for sealing and transmitting forces in pipe joints.

A further field of use is prevention, i.e. the preventative additional protection of a pipe joint against possible leakages, in particular in the case of critical flow media or subsequent restricted accessibility of the pipe joint after it has been laid. In addition, a pipe joint according to the invention permits the subsequent renovation of a leaky pipe joint by the latter being strengthened according to the features of the invention. Such subsequent renovation is especially advantageous in such pipe joints in which conventional sealing rings are used for the sealing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pipe joint, comprising:
   at least a first and a second pipe,
   the first pipe comprising a section arranged at an end of the first pipe, opening out, and the second pipe comprising a further section arranged at an end of the second pipe and being inserted into the first pipe section such that an overlap region of the first pipe section and of the second pipe further section is formed, wherein a gap exists between the first pipe section and the second pipe further section, and wherein at least one input passage is arranged in the inner surface of the further section of the second pipe, to introduce a free-flowing sealing medium into the gap.

2. The pipe joint as claimed in claim 1, wherein the sealing medium is a curable plastic.

3. The pipe joint as claimed in claim 1, wherein a frictional connection is formed between the section of the first pipe and the further section of the second pipe by the sealing medium.

4. The pipe joint as claimed in claim 1, wherein the section of the first pipe and the further section of the second pipe are connected in a watertight manner by the sealing medium.

5. The pipe joint as claimed in claim 1, wherein at least one of the inner surface of the section of the first pipe and the outer surface of the further section of the second pipe is roughened.

6. The pipe joint as claimed in claim 1, wherein at least one of the first and the second pipe is made of a glass-fiber-reinforced plastic.

7. The pipe joint as claimed in claim 1, wherein the sealing medium is an epoxy-resin/glass-fiber mixture.

8. The pipe joint as claimed in claim 1, wherein at least one of an inner surface of the section of the first pipe and an outer surface of the further section of the second pipe has a profile.

9. The pipe joint of claim 1, wherein the further section arranged at the end of the second pipe is inserted into the first pipe section such that an overlap region of the section and of the further section is formed as a push-in bell-and-spigot pipe joint.

10. The pipe joint as claimed in claim 1, wherein a number of input passages are arranged in the overlap region to introduce the sealing medium.

11. The pipe joint as claimed in claim 10, wherein the number of input passages are arranged along the circumference of the second pipe.

12. The pipe joint as claimed in claim 10, wherein at least one output passage is arranged in the overlap region on at least one of the first and second pipe so air located in the gap can escape.

13. The pipe joint as claimed in claim 1, wherein at least one output passage is arranged in the overlap region on at least one of the first and second pipe, so air located in the gap can escape.

14. The pipe joint as claimed in claim 13, wherein a number of output passages are arranged in the overlap region on at least one of the first and second pipe, for air to escape.

15. The pipe joint as claimed in claim 13, wherein at least two spaced-apart physical seals are arranged in the overlap region between the first and the second pipe to substantially prevent the escape of the sealing medium, the seals extending over the circumference of at least one of the first and second pipe, each seal being inserted into a circumferential groove of at least one of the first and second pipe, the at least one input passage and the at least one output passage being arranged between the at least two physical seals.

16. The pipe joint as claimed in claim 13, wherein the at least one output passage is arranged in the section of the first pipe on the outside of the first pipe.

17. The pipe joint as claimed in claim 13, wherein the at least one output passage is arranged in the further section of the second pipe on the inner surface of the second pipe.

18. The pipe joint as claimed in claim 13, wherein the at least one output passage is arranged in the further section of the second pipe on the inner surface of the second pipe.

19. The pipe joint as claimed in claim 14, wherein the number of output passages are arranged along the circumference of at least one of the first and second pipe for air to escape.

20. The pipe joint as claimed in claim 1, wherein at least two spaced-apart physical seals are arranged in the overlap region between the first and the second pipe to substantially prevent the escape of the sealing medium, the seals extending over the circumference of at least one of the first and second pipe, each seal being inserted into a circumferential groove of at least one of the first and second pipe, the at least one input passage and at least one of the output passages being arranged between the at least two physical seals.

21. The pipe joint as claimed in claim 20, wherein the at least two spaced-apart physical seals are sealing rings.

22. The pipe joint as claimed in claim 14, wherein at least one of the output passages is arranged in the section of the first pipe on the outside of the first pipe.

23. The pipe joint as claimed in claim 15, wherein the at least two spaced-apart physical seals are sealing rings.

24. The pipe joint as claimed in claim 15, wherein the at least one output passage is arranged in the section of the first pipe on the outside of the first pipe.

25. The pipe joint as claimed in claim 15, wherein the at least one output passage is arranged in the further section of the second pipe on the inner surface of the second pipe.

26. A method of producing a pipe joint between a first pipe having an opened-out section arranged at one end and a second pipe having a further section arranged at an end, comprising the steps of:
   a) inserting the further section of the second pipe into the opened-out section of the first pipe to form an overlap region;
   b) introducing a sealing medium into at least one input passage arranged in the overlap region of both pipes on the inner surface of the second pipe to allow air located in a gap between the first pipe section and the further section to escape via at least one output passage arranged in the overlap region on at least one of the first and second pipe; and
   c) closing the input passage and the output passage.

27. The method as claimed in claim 26, wherein at least two spaced-apart seals are arranged in the gap to substantially prevent the escape of the sealing medium, and are each inserted into a circumferential groove of at least one of the first and second pipe.

28. The method as claimed in claim 26, wherein the sealing medium comprises a curable plastic.

29. The method as claimed in claim 28, wherein at least one of a frictional and watertight connection is formed between the first and the second pipe by the sealing medium.

30. The method as claimed in claim 26, wherein the sealing medium comprises an epoxy-resin/glass-fiber mixture.

31. The method as claimed in claim 27, wherein the at least two spaced-apart seals are sealing rings.

* * * * *